(12) United States Patent
Epstein

(10) Patent No.: US 12,521,016 B1
(45) Date of Patent: Jan. 13, 2026

(54) SYSTEM AND METHOD FOR MEDICAL CONDITION DETECTION AND TRIAGE USING MOBILE DEVICES

(71) Applicant: Joseph Alan Epstein, Pleasanton, CA (US)

(72) Inventor: Joseph Alan Epstein, Pleasanton, CA (US)

( * ) Notice: Subject to any disclaimer, the term of this patent is extended or adjusted under 35 U.S.C. 154(b) by 67 days.

(21) Appl. No.: 16/123,774

(22) Filed: Sep. 6, 2018

Related U.S. Application Data

(60) Provisional application No. 62/557,589, filed on Sep. 12, 2017.

(51) Int. Cl.
*A61B 5/00* (2006.01)
*A61B 5/0205* (2006.01)
(Continued)

(52) U.S. Cl.
CPC .......... *A61B 5/0064* (2013.01); *A61B 5/0022* (2013.01); *A61B 5/0205* (2013.01);
(Continued)

(58) Field of Classification Search
CPC ....... A61B 5/0261; A61B 5/445; A61B 5/444; A61B 8/4483; A61B 5/0064; A61B 5/0022; A61B 5/0205; A61B 5/1104; A61B 5/1127; A61B 5/1128; A61B 5/16; A61B 5/163; A61B 5/4368; A61B 5/4393; A61B 5/4803; A61B 5/4824; A61B 5/7275; A61B 5/743; A61B 5/02427; A61B 5/0816; C04B 35/491; C04B 35/62655; C04B 2235/3249; C04B 2235/5436; C04B 38/068; C04B 2111/00836; C04B 2111/00844; C04B 2235/528; C04B 2235/5463; C04B 2235/96; C04B 35/62805;
(Continued)

(56) References Cited

U.S. PATENT DOCUMENTS 3,783,282 A * 1/1974 Hoppenstein ............ A61B 6/02
378/41
2008/0103390 A1* 5/2008 Contag .................. A61B 90/36
600/478

(Continued)

OTHER PUBLICATIONS

Hoiem, Derek; "Computational Photography"; University of Illinois.
(Continued)

*Primary Examiner* — Hien N Nguyen
(74) *Attorney, Agent, or Firm* — JW Law Group; James M. Wu

(57) ABSTRACT

A method and system for detecting possible disease and condition indications on a patient, using combinations of two dimensional, infrared, and three-dimensional (such as dot) cameras. In one embodiment, the cameras are located in a smartphone that the patient uses to aim at parts of the body, wherein features or motion potentially corresponding to indications of disease or conditions are extracted and analyzed. A further embodiment conducts triage for conditions detected or otherwise. Further embodiments use augmented reality overlays to assist the patient through the various procedures, guide in the data collection, and identify to the patient necessary and useful information.

21 Claims, 5 Drawing Sheets

(51) Int. Cl.
*A61B 5/024* (2006.01)
*A61B 5/026* (2006.01)
*A61B 5/08* (2006.01)
*A61B 5/11* (2006.01)
*A61B 5/16* (2006.01)
*G06T 7/00* (2017.01)
*G06T 11/60* (2006.01)
*G16H 50/20* (2018.01)
*G16H 50/30* (2018.01)
*G16H 50/50* (2018.01)

(52) U.S. Cl.
CPC .......... *A61B 5/0261* (2013.01); *A61B 5/1104* (2013.01); *A61B 5/1127* (2013.01); *A61B 5/1128* (2013.01); *A61B 5/16* (2013.01); *A61B 5/163* (2017.08); *A61B 5/4368* (2013.01); *A61B 5/4393* (2013.01); *A61B 5/444* (2013.01); *A61B 5/445* (2013.01); *A61B 5/4803* (2013.01); *A61B 5/4824* (2013.01); *A61B 5/7275* (2013.01); *A61B 5/743* (2013.01); *G06T 7/0012* (2013.01); *G06T 11/60* (2013.01); *G16H 50/20* (2018.01); *G16H 50/30* (2018.01); *G16H 50/50* (2018.01); *A61B 5/02427* (2013.01); *A61B 5/0816* (2013.01); *G06T 2207/10012* (2013.01); *G06T 2207/10016* (2013.01); *G06T 2207/10048* (2013.01); *G06T 2207/30088* (2013.01); *G06T 2207/30096* (2013.01); *G06T 2207/30104* (2013.01)

(58) Field of Classification Search
CPC ...... C04B 2235/422; C04B 2235/5481; C04B 2235/77; C04B 2235/5445; H10N 30/084; H10N 30/8554; H10N 30/097; G06T 7/0012; G06T 11/60; G06T 2207/10012; G06T 2207/10016; G06T 2207/10048; G06T 2207/30088; G06T 2207/30096; G06T 2207/30104; G16H 50/20; G16H 50/30; G16H 50/50
See application file for complete search history.

(56) References Cited

U.S. PATENT DOCUMENTS

| | | | | |
|---|---|---|---|---|
| 2008/0226151 | A1* | 9/2008 | Zouridakis | G06T 7/0012 600/300 |
| 2011/0218428 | A1* | 9/2011 | Westmoreland | A61B 6/00 600/425 |
| 2013/0342756 | A1* | 12/2013 | Xu | H04N 23/69 348/370 |
| 2014/0066780 | A1* | 3/2014 | McQueen | A61B 5/16 600/473 |
| 2014/0074479 | A1* | 3/2014 | Kassam | G10L 25/48 704/270 |
| 2015/0045012 | A1* | 2/2015 | Siminou | H04M 1/724092 455/419 |
| 2015/0087257 | A1* | 3/2015 | Balram | H04W 4/90 455/404.1 |
| 2017/0109486 | A1* | 4/2017 | Tran | G16H 70/20 |
| 2017/0186160 | A1* | 6/2017 | Satish | G06T 7/62 |
| 2019/0200002 | A1* | 6/2019 | Liu | G01B 11/25 |

OTHER PUBLICATIONS

Iwane, Toru. (2016). Light field display and 3D image reconstruction.

* cited by examiner

SYSTEM AND METHOD FOR MEDICAL CONDITION DETECTION AND TRIAGE USING MOBILE DEVICES

CROSS REFERENCE TO RELATED APPLICATION

This application claims the benefit of provisional patent application Ser. No. 62/557,589, filed Sep. 12, 2017 by the present inventor, the entire content of which is hereby incorporated by reference.

BACKGROUND OF THE INVENTION

1. Field of the Invention

The present invention relates to the field of electronically detecting physical disease and condition indications through the use of portable cameras and computational technology, such as those integrated into modern smartphones.

2. Description of the Prior Art

Unprecedented advancements in consumer mobile device technology, such as that contained in available computers and smartphones, have placed face, detail, and now even infrared technology in the hands of millions of people. Although the technology is used out of the box merely for consumer entertainment features, these technologies allow for incredible novel uses for improving medical diagnostics. With the invention disclosed herein, patients and medical service practitioners are able to perform at-home diagnoses of a variety of common and rare diseases. And with the integration into machine learning architectures (such as that disclosed by the present inventor in other patent applications), this data can train computers to infer patient disease states and aid or arrive entirely at new diagnoses and treatment plans using these new indications.

The advantages of some of these newer technologies is that they can allow the device to see unprecedented level of detail on the skin and under it, as well as to be able to record and detect finer details of motion. Even with traditional optical only cameras, tremendous value is provided, as disclosed in the invention below. But these additional technologies allow for even further diagnostic power.

This matters because, prior to this invention, there was no practical way for this sort of rich triage and injury information to be collected by everyday patients at home. Instead, patients were forced to sit in waiting rooms at distant and crowded urgent care centers, investing both their own and the facility's time to have a clinician examine the patient, often to find that the trip was a waste and a simple over-the-counter remedy was the appropriate treatment.

Many disorders leave traces in the visual recording of the patient, but would otherwise go unnoticed. These videos may be taken by the patient or others just as a part of everyday life, or they may be requested by the patient or others for the specific purpose of diagnosing or evaluating the patient. Until this invention, however, those videos were mostly unobserved, and of such poor quality and use that a doctor's time would be entirely wasted by viewing them.

The present invention discloses a way of making use of this wealth of information—including integrating the newer technologies of three-dimensional imaging, facial learning, and infrared learning that are deployed in cutting edge consumer devices—to aid with diagnosis.

SUMMARY

In accordance with one embodiment, a method and system for detecting visible disease and condition indications on a patient, using combinations of two dimensional, infrared, and three-dimensional (such as dot) cameras. Further embodiments use machine learning to assist in the identification of disease and condition indications. Further embodiments still assist in the performing of triage through the information derived. Throughout, some embodiments allow the supervision or assistance of real people to guide or operate the diagnostics and triage.

DETAILED DESCRIPTION

Figure 1:
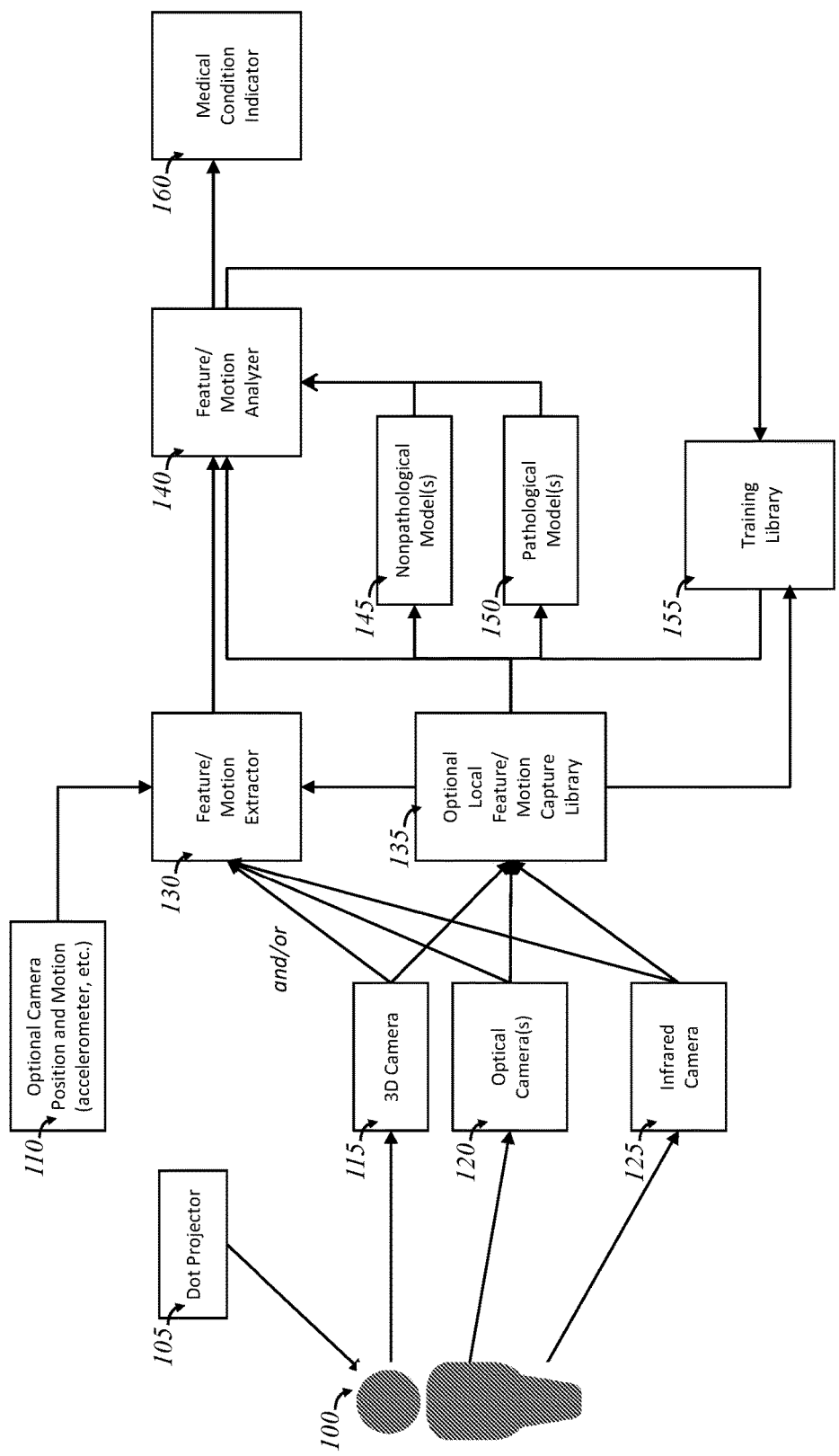
FIG. 1 is a diagram of an embodiment of the invention, showing the patient, one or more imaging systems, a feature/motion extractor, analyzer, pathological and nonpathological models, and a condition indicator.

FIG. 1 shows the general architecture of the disclosed invention. The various forms of visual and tracking information available from one or more mobile devices are fed into the detection engine. The inputs include any or all of the optical camera 120, a three-dimensional imaging camera 115, or an infrared camera 125. The three-dimensional imaging camera 115 may be a dot camera, used in conjunction with a dot projector 105, or it may be derived using parallax from multiple optical cameras, or it may be derived from using a light field camera, which has the property of gathering the visual field at different depths and being able to derive those depths. These inputs are then fed into a feature/motion extractor 130. An optional camera position and motion unit 110 may be coupled to the feature/motion extractor 130. One embodiment of a motion extractor uses static, manually-created motion detection algorithms known to the art. Some of these algorithms are body part specific—facial recognition is a particularly fruitful area in the art—and others are more generic. Another embodiment uses machine learning (convolutional or straight, with or without manual supervision), also as known to the art. The extracted feature/motion descriptions are then fed into the analyzer 140, which compares the features and/or motions of the patient with those in the nonpathological model 145 and/or pathological model 150. One embodiment uses machine learning to derive those features and stores them in the pathological and/or nonpathological training sets. One further embodiment is to perform only pathological training; another is to perform nonpathological training; and a third uses both together (with the appropriate backpropagation as known to the art). These pathological and nonpathological representative motions are be population wide in one embodiment, or are based as well on training performed on the patient's own unique physiology in another. These representative models may be local, or they may be sourced from the training library 155, which itself may be local or cloud/network hosted. Some of that training may be obtained or augmented from an optional preexisting local motional capture library 135 (such as the one that comes with high end mobile devices). One possible result of the motion analyzer is the degree of abnormality of the motion to the models. In one embodiment, the results of the motion analyzer are fed back into the training library 115 to improve the library's accuracy, as cohort or population updates based on the disease category and patient health categories. They may also be used to improve upon a patient-specific model as well; one embodiment uses repeated or continuous backpropagation.

The medical condition indicator 160 then consumes the analyses, and with repeated exposure, determines trends and severity indications for further use in improving the health of the patient or arriving at a tentative or positive/negative diagnosis or information to aid others in such a conclusion.

Timeshifting is key as well: the use of the photo library (potentially taken elsewhere or on a different device) rather than real time photos is an explicit embodiment of this invention. The diagrams do not show the photo library, as it is to be understood that the connections between the cameras 115, 120, 130, etc. and feature/motion extractor 130 etc. may be timeshifted through the use of a photo library, or that different cameras may have populated the photo library that is used. The physical location of the blocks in the diagrams may be local to the device, spread across multiple devices, in a cloud, or present in both, thus describing both coordinated and separate embodiments of the invention. This may allow for ongoing refinement of the techniques, cross-population modelling, background processing of the photo library or historical records, and iterative improvement to occur without needing the patient's mobile device to be engaged Physiological and Neurological Disorders Many neurological disorders are characterized by unique patterns of motion. These patterns may start out subtly and intensify, or they may be quite specific from the inception of the disease. Some of the motions may be suppressed—lack of motion of some muscles in response to normal stimuli—or they may be exaggerated or unusual, such as tics or spasms. Some motions May be hitches in ordinary motion, where for example the motion of an appendage should follow a particular arc but becomes interrupted for a short time by the disease in question.

Detail motion analysis may provide the ability to detect these disorders. Facial tracking technology present in the mobile device already is designed to capture the motion of eyes and dozens of facial muscles. Some mobile devices use dot projectors to perform motion capture to augment that tracking and greatly improve the accuracy of the tracking. An involuntary tic, hitch, or suppression in any of these muscles is an indication of a potential disorder or state condition: various embodiments of this invention determine such indications.

There are a variety of disorders and conditions which are detectable by various embodiments of the present invention. The following list is not exhaustive by any means.

One embodiment of the invention detects even subtle possible indications of motion sickness or nausea by the repeated motion of the eye (pathological nystagmus).

One embodiment detects indications of tardive dyskinesia by comparing motions to the known inventories of repetition. Another embodiment uses machine learning (such as through neural networks) to detect new repetitive motions.

One embodiment detects indications related to the degree of inebriation or impairment of a patient by looking at well-known motion signs including at last one of slurred or inaccurate lip motion related to speech (using the correlated audio as an input to the motion analyzer is another embodiment, as that combination will work for machine learning analyses), nystagmus, head motion (using the motion sensor of the mobile device to correlate the visual motion and produce an accurate overall sense of the motion of the patient is an embodiment of this invention), and camera hand motion. A variety of indications for potential conditions, such as detoxification states and degrees of efficacy of treatment, are detectable by the invention in this way.

One embodiment detects the severity of a stroke or other neurological reaction by the basis of asymmetrical motion of the patient. One embodiment uses facial motion asymmetry. Another uses body asymmetry, such as when folding hands. Another uses gait analysis of the patient, when the patient is not holding the camera. Another uses the rocking motion of the mobile device when the patient is walking—in concert with an ongoing recording, this data is particularly rich in asymmetric and otherwise dysfunctional motion information.

One embodiment detects the potential degree or identity of a physiological movement disorder by observing partial or whole body motion of the patient. A hitch or other sticking of a body part's motion can be quite rich in diagnostic information when used in the present invention. One further embodiment uses the motion of the knee, elbow, shoulder, hip, wrist, ankle, neck, or jaw. One embodiment uses the motion of the jaw to detect temporomandibular joint dysfunction by the sticking or hitching of the motion; another by the range of motion of the jaw. One embodiment is to detect torn cartilage by the lack of smoothness of the motion and/or the range. One embodiment is to infer the severity of ligament or joint tissue by the motion as above. Note, for example, that by observing the motion of a knee joint and tracking the location and orientation of the patella, a variety of knee conditions can be observed. Further note that the bulging—static or during the range of motion—of a body part is used by various embodiments to aid in the detection of swelling or deformity.

These detections/indications need not be black and white: in one embodiment, subtle early signs are used to suggest follow up analysis. One embodiment uses them to trigger propitious or opportunistic (or other) further analyzes.

This invention allows for a variety of subjects of motion to aid in indication detection. Facial motion is one thing that new smartphones are particularly good at, but the present invention is more general, and thus different embodiments are used for learning about motions of the person holding the camera and not in it, and a patient in the field of view of the camera when not holding the camera. Such is the power of machine learning (such as with facial recognition) as taught herein to determine who is doing what in a scene.

Patient Challenges

When a doctor, therapist, or a computer requests the patient to do something specific, this challenge may directly lead to the uncovering of possible conditions and their severity. Some embodiments disclosed herein may be applied opportunistically—when the patient happens to be in the scene. But when the patient is requested to perform a certain behavior for the camera—do a motion, show a body part, etc.—the potential greatly magnifies.

One further embodiment communicates the request for the challenge through the mobile device using an application or web page. This comes from an interactive or prior request from a practitioner in one embodiment. In another, this comes from an automated medical management system such as the one disclosed in Ser. No. 16/045,947 by the present inventor.

One embodiment is to diagnose diseases of motion. The patient is requested to present the body part in question (a hand, foot, arm, etc.) and then perform a specified motion. The degree to which the motion does not occur is used in the motion analyzer to aid in the determination of the condition. When applied to neuropathy, not only may the motion be used, but in addition or instead the reactivity of the body to specified interactions may be used. To diagnose peripheral neuropathy in a foot of a diabetic, for example, the patient is asked to present the sole of his foot to the camera and then jab his arch with his finger or with a similar instrument. The muscular reaction of the foot to the stimulus or in anticipation of the stimulus can reveal information about the potential disorder. (People will often tense their feet before it is touched; furthermore, upon touching, the toes May move a bit more for a sensitive patient than a neuropathic patient. The present invention disclosed herein is quite flexible: it may operate as a platform for automated diagnoses based on particular a priori scientific research, and it may also operate on automatically machine-learned reactivity where the indications are more statistical in nature.)

Mood, Pain, Mental State

In one set of embodiments, the present invention may be used to helping determine the mental state of a patient. One embodiment uses the natural wincing or similar motions of a patient to help determine his sensitivity (such as disclosed above for neuropathy). Another embodiment uses the current condition of the patient as is, without a challenge or stimulus.

Figure 2:
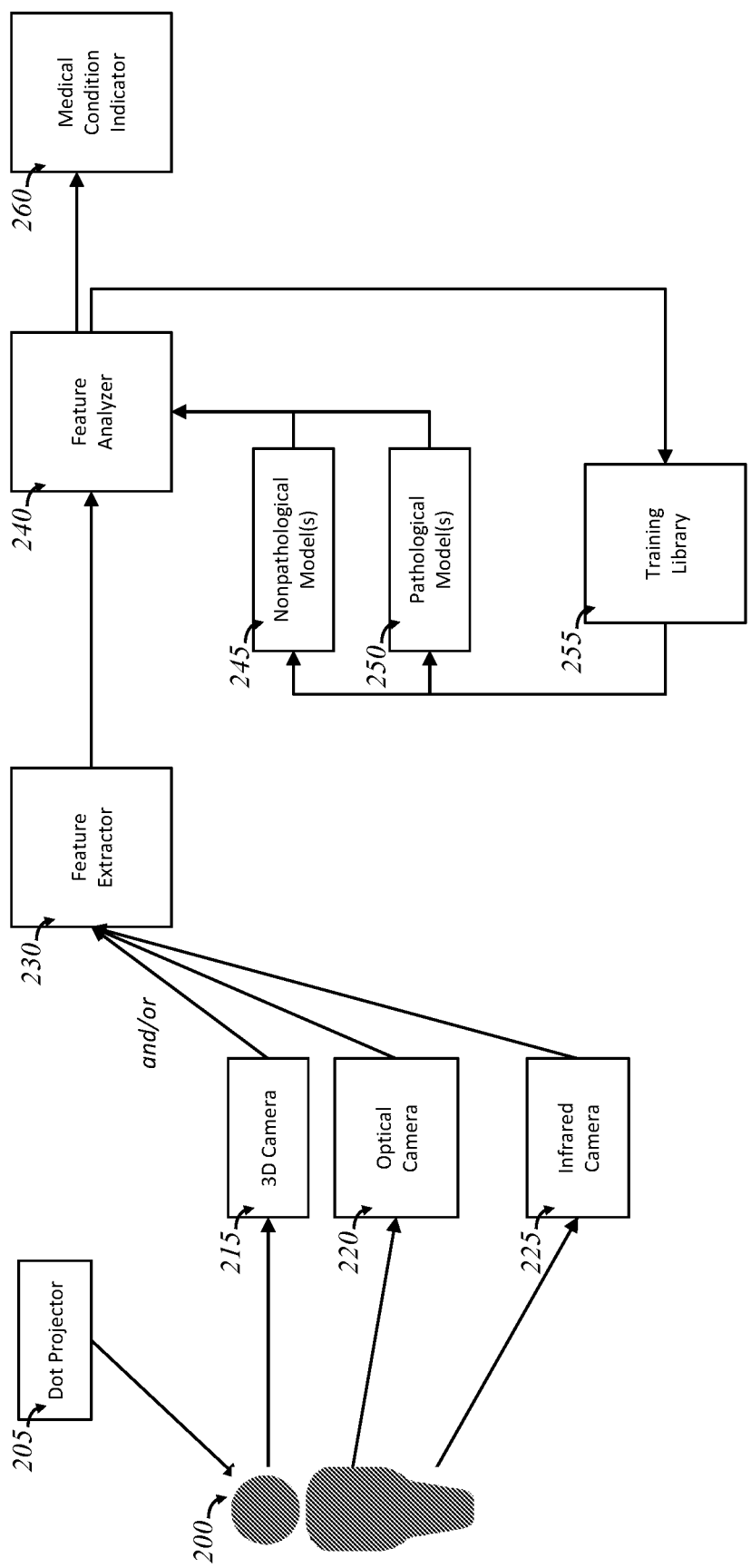
FIG. 2 is a diagram of an embodiment of the invention further limited to feature extraction.

FIG. 2 shows an embodiment of the present invention pared down for pure feature extraction, with the optional capture library 135 removed. The embodiment illustrated in FIG. 2 includes several of the components illustrated in and described with reference to FIG. 1 and further includes a feature extractor 230, and a feature analyzer 240. For example, in one embodiment, blocks 205, 215, 220, 225, 245, 250, and 255 shown in FIG. 2 are the same as blocks 105, 115, 120, 125, 145, 150, and 155 shown in FIG. 1, respectively. One embodiment of the invention is to apply the blocks in FIG. 2 purely for static feature detection; another is to use motion as. Methods are known to the art for matching faces to emotional states on an a priori basis—that is, a reference model is created by researchers, and then machine learning algorithms are trained on those reference models and then applied to the patient in question. And using such models is one embodiment of the present invention. However, those models are based on sample set biases, as well as on the categorization biases of the researchers. Furthermore, additional research has shown that emotional categorization may be far more fluid and variable between people, and might not be the universal or cultural norm that had been expected in the past.

This leads to the following further embodiment. This embodiment takes local training (either already captured for nonmedical purposes such as in the facial recognition unlocking models used in current computers and smartphones, or otherwise), as well as data gathered by inferring from inventories requested of the patient and historical activities that the patient has performed where her mood can be ascertained to populate inferred emotional state. Another embodiment uses postings on social media to determine the patient's self-reported mood (directly by categorical analysis or indirectly through associative learning) and then uses time or context correlation to populate the inferred emotional state.

Inventories asked of the patient can be one time or continuous. One embodiment of a training inventory is to ask the patient to act out various emotions or moods for the camera, which the invention then uses to populate the training library with patient specific data. This itself can be repeated based on indication, time, or need, to track the patient's ability to act over time. One further embodiment produces diagnostic hypotheses from this data: for example, a patient who is sad may have a harder time acting out happy emotions in a way that correlates well with his earlier attempts or with population or cohort models. Whenever a patient is suspected of having a change of emotion—either manually populated or determined by analysis of facial or body posture through recordings or promptings—the patient may be asked how he is feeling. One embodiment uses this self-report to improve the modeling; another uses it to identify a potential need for intervention.

Blood flow is an important data point. The presence of infrared recording cameras gives a window into the blood flow of the patient, and using that infrared reading as a part of the correlative modeling is an important embodiment. Furthermore, sometimes even subtle changes in the amount of blood pooled in various tissues—and thus detectable by a three-dimensional modeler such as a dot projector—can identify problems. Cheeks turning red in anger become hot, and swell with blood.

Pain is evidenced by wincing and grimacing reactions, some of which may be more difficult to control depending on the degree of pain. A change in the facial expressions of the patient over time through this invention may a good indicator of pain progression, and is thus performed by one embodiment. Another embodiment though is to ask the patient to look into the camera and think about the pain, thus detecting the subtle and not-so-subtle changes.

Note that mood and state detection need not occupy the camera to the exclusion of other operations. One embodiment is to couple the detection with the patient's own video logging of his state; another uses teleconferencing with a practitioner or other person; another uses a diagnostics or triage "bot". The patient's reactions to the prompts—for emotion or any other self-reflected mental state—may be used as discrete or continuous sources of information.

Wound, Lesion, Bite Diagnosis, Gangrene

Wounds and lesions often have their own shape and structure, one that high resolution and three-dimensional imaging can identify. The architecture is the same as before (such as those of FIG. 1 and FIG. 2), but the detected and extracted patient features may be different.

Let's take skin disorders. A patient may present with a red rash. This rash could be from a number of different conditions: hives from allergies, eczema, a scrape from a fall, or an infection. Each of these disorders comes with its own two- and three-dimensional visual features. Hives may be smooth, red, and hot. Eczema is often rough, scattered, and relatively cooler (low IR). A scrape may show the characteristic parallel lines from the abrasive surface, as well as spotty scabbing or torn upper dermis with redness but usually not well-defined swelling or unusual heat. A fungal infection such as ringworm may show an outer border and inner redness. Herpetic lesions are crusty yellow blisters. A tick bite with Lyme disease has a characteristic ring to it as well. A spider bite may have a necrotic center. All of these are feature inputs from the optical, infrared, and dot (depth)

cameras to the invention: the detection of the potential indications above are each embodiments.

Blood flow changes around a site of injury may be particularly useful in detecting necrosis. Later stages of necrosis go from hot to cold as the tissue dies completely. One embodiment diagnoses frostbite and gangrene from such temperature changes: applications of those embodiments may be especially when the patient volunteers to show the diseased body part, but they may also be applied when the body part happens to come into view.

The inventory of these lesions maintained in the training library, as before, may be pre-seeded into the library and are able to be updated as follow-up diagnostics are performed. One embodiment is for the patient, doctor, or practitioner to be asked or to inform the invention of the proper diagnosis or likelihood of the particularly observed lesion.

Sexual Behaviors and Disorders

Further applicability comes when looking for blood flow and body shape changes for sexual organs. This embodiment may emphasize the nonpathological per se modeling of the invention to categorize the various responses of the patients. Admittedly, pointing a facial recognition feature at a person's genitals may seem shocking, but the same data sources and modeling techniques apply. Sexual stimulus changes the blood flow patterns and shape of genitals. People also display stimulus response through blood flow changes and expressions of the face and body outside the genital region during various stages of arousal. The problem with gathering this data in a clinical setting is that patients do not usually become involved with sexual activities in a clinic. In part, such displays may be embarrassing for the patient, and the use of automated machine techniques may be a comfort. Therefore, what is needed—and thus provided by a set of embodiments of this invention—is a tool to capture the patient's response at home, and then derive clinically useful information from that.

Sexual disorders may present in such a way that the visual data gathering can lead to an indication. For example, priapism involves blood flow patterns that keep the penile tissues engorged long after they should have released the blood back into the body. Temperature of the engorged tissues, shape changes, and even the visualization of the three-dimensional aspect of surface vessels can provide clinically relevant information.

For conditions that require understanding a patient's sexual arousal patterns, one embodiment provides visual or audio stimulus through the mobile device. Another requests that the patient engage in particular behaviors, such as manual stimulus, or even shifting posture. The invention in this embodiment is then engaged to detect the shape, heat, and color of the patient's body parts as needed. Again, an advantage may be that doing such detection in the comfort of the patient's home can reduce embarrassment and emotional pressure, and even if the recorded information is needed to be reviewed by a human expert, such review can be done in a way that is discrete and maintains the dignity of the patient.

This benefit may be seen particularly vividly with the coupling to machine learning. Patients often do not want to show their bodies in various states of sexual arousal to a clinician. But if a computer is on the other end, observing, learning, and indicating potential conditions, then a patient may be willing to use such a tool to detect sexual conditions and have them reported to the clinician as needed. Furthermore, one embodiment (this is not just for sexual disorders but for any, but is mentioned here for obvious reasons) is for a further artificial intelligence modeler to take the indicated conditions or even the feature and motion extractions, and use them with non-patient visual models to construct a composite, privacy-maintaining visual or motion that shows the patient's condition exactly as it is. This differs from the previous paragraph in that the reconstructed visuals are artificial and do not correspond to the patient in particular, and yet can show accurate displays of the condition and its effects. (It is not difficult at all to imagine why a patient with, say, pelvic floor dysfunction might not want to record a video of her body showing the condition for her doctor but would not mind her doctor see an artificial, non-personally-identifiable recreation of the various parts of the condition that she has, attuned to her particular severities.) The particular methods for such reconstruction are known to the art—refer to the work at the University of Washington for how an artificial Barack Obama can be made to say anything—but the use of such methods for medical reconstruction are novel in light of the present invention. Note that the embodiments are independent of the condition—sexual or otherwise—used to detect them, and can be applied to any relevant condition.

Heart and Lung Disorders, Breathing, Chest Markers

Another series of embodiments are applicable to detecting heart and lung conditions. When pointed at the chest, the dot projector and the infrared camera provide tremendous data opportunities that the disclosed invention can use.

One embodiment uses the cameras to detect heart beating patterns by the rise and fall of the chest wall, and the shape changes (symmetric alterations, etc.) of the chest wall as the heart beats, to detect the heart function. A dot camera or other three-dimensional imaging device is aimed at the heart for some time. The motion of the dots, of course, produce a three-dimensional shape and motion. Using the disclosed invention to analyze that shape and compare it to a reference heart model allows the invention to detect the shape of the heart as it beats, the various stages of the beat, and abnormalities of the beat. One embodiment uses unsupervised or lightly supervised machine learning when fed with the patient data or training data and actual heart function inputs to derive a classification or similar correlation. Another embodiment applies a constructed three-dimensional model of the heart and patient shape to derive the expectation of the shape and structure and then compare the two, such as through a machine learning algorithm. Infrared data is also of value here. The infrared data of the chest cannot peer into the heart to see deep blood flow; however, data gathered as above for other use cases or for this use—by happenstance, patient volition, or in response to challenges and requests to look at different body parts such as extremities, the nose and ears, and so on—may provide additional data about blood flow and heart health that one embodiment correlates with the machine learning engine.

Another embodiment uses the three-dimensional camera and IR camera aimed at the crease of the elbow or the neck to observe the shape change and behavior of the veins as blood flows through them. Similar modeling as with the heart may allow the invention to derive, by model comparison, the patient's heart status.

Another embodiment is to use the cameras and correlation (such as in 140 and 160) determine lung function as follows. When a person breathes, her chest moves in certain ways that may be correlated to lung and breathing conditions. A hitch in breathing, or asymmetric diaphragm or chest motion, can reveal lung injuries or pain. The shape of the chest during breathing may be extreme, for example, when the patient has restricted airflow and has to take unusually deep breaths. An asthma attack may be observed by the correlation of the lung pattern, the frequency of breathing, and the sound produced from the lungs which is captured by the microphone of the handheld device.

Furthermore, the mobile device may be aimed at the patient's mouth or nose—straight on in or obliquely—to detect the breath. Infrared cameras are particularly adept at this, as they work well when given an appropriate background to compare against.

Triage and Treatment

All of this technology in the hands of the patient makes further technology possible. In one embodiment, the patient uses augmented reality—the overlay of the camera image with information—to identify body parts with problems or to be walked through with how to treat a condition or perform even the most routine behaviors.

Figure 3:
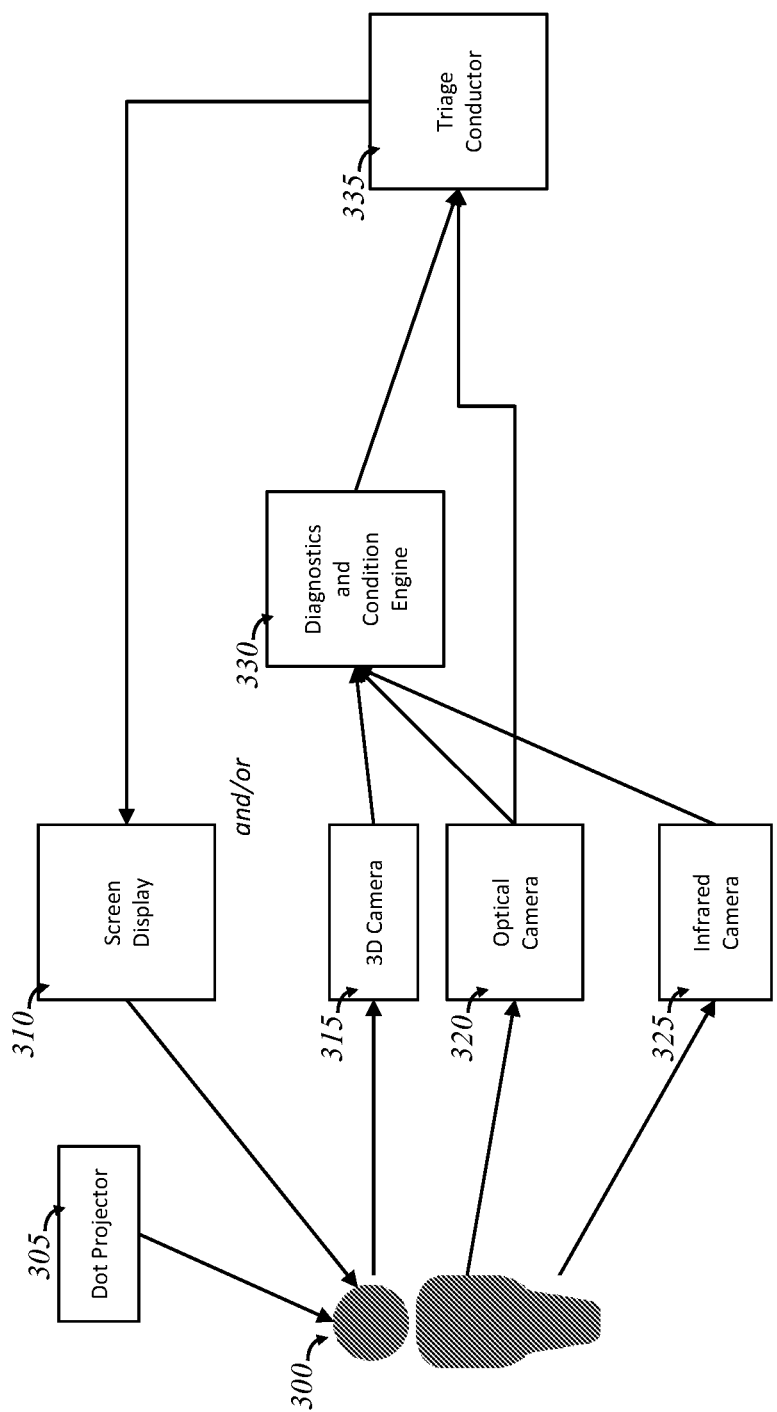
FIG. 3 is a diagram of an embodiment of the invention targeting triage.

FIG. 3 discloses a structure for performing triage. The embodiment illustrated in FIG. 3 includes several of the components illustrated in and described with reference to FIG. 1. For example, in one embodiment, blocks 305, 315, 320, and 325 shown in FIG. 3 are the same as blocks 105, 115, 120, and shown in FIG. 1, respectively. The patient 100 uses an application on the mobile device to request service for triage. (Note that the diagnostics and condition engine 330 may include the structures disclosed in FIG. 1 and FIG. 2.) The patient 100 points one or more cameras 115, 120, and 125 at the body part(s) in question, and the triage conductor 335 requests the patient to make any changes as needed—show a different body part, or a different angle, or perform the following motion or do the following task, and so on—via screen 310. The diagnostics and condition engine analyzes the data in real time (or delayed if needed) and provides its results for the triage conductor.

One embodiment is for the triage conductor to be a person. Another embodiment is for the triage conductor to be a fully automated "bot". This would allow, for example, the recording of information for presentation to the patient, or if severe enough or at the request of the patient, for later providing to a practitioner or expert. Another embodiment is for a personally supervised automated triage conductor: a person observes the operation of the automated triage conductor, with an option of stepping in and influencing the operation as needed.

Figure 4:
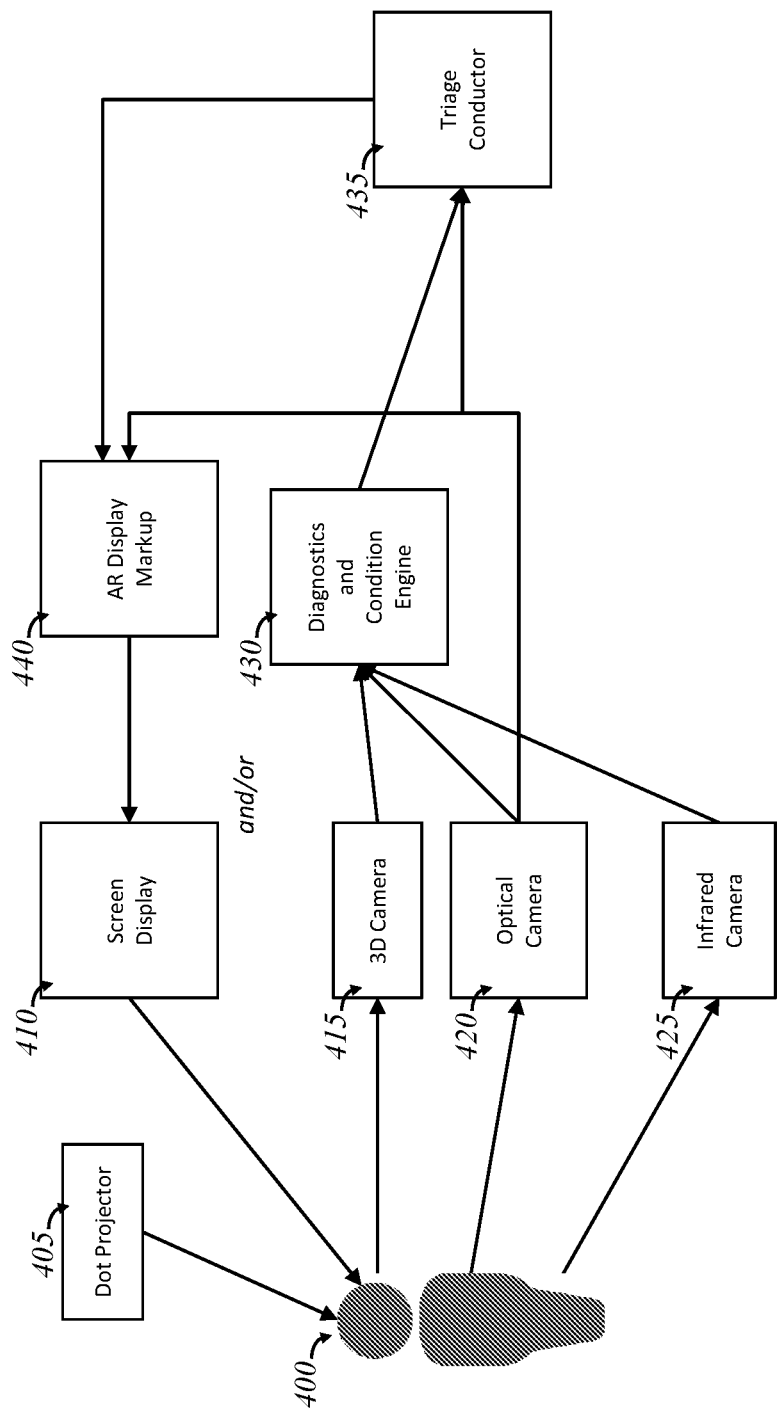
FIG. 4 is a diagram of an embodiment of the invention targeting triage showing a structure using augmented reality to provide instructions and feedback to the patient.

Another embodiment is for the patient to see through their screen what they are performing. FIG. discloses an embodiment using augmented reality to show this. The embodiment illustrated in FIG. 4 includes several of the components illustrated in and described with reference to FIG. 1 and FIG. 3. For example, in one embodiment, blocks 405, 415, 420, and 425 shown in FIG. 4 are the same as blocks 105, 115, 120, and 125 shown in FIG. 1, respectively, and blocks 430 and 435 shown in FIG. 4 are the same as blocks 330 and 335 shown in FIG. 3, respectively. The addition of the AR display markup 440, showing the view of the camera but overlaid with information, allows the patient to view the injury area and take further action. In one embodiment, the markup highlights the injury, and present the various inferred data and conclusions on the screen. The patient may then touch the screen and view more information, move markers and pointers to better highlight the area in reference, or change inaccurate or false conclusions. In a specific example, the system automatically identifies the edge of a skin lesion. If it missed a part, the patient may then click on the boundary of the lesion and redraw it to capture the missing part. This can be useful in perfecting the measurement, color, shape, or properties of various parts of the structure in question. This could even be ordinary structures or ranges of motion—for example, highlight the tip of your elbow, or click on the screen how far the body part in the image can move without pain, point to where your kneecap used to be before it moved to where it is now because of the injury.

This method may be deployed in concert with other cameras as further embodiments. In devices with front facing and rear facing cameras, often the cameras have different modes. Augmented reality works with both front facing cameras—to mark up your own "selfie"—and rear facing. But one need not discard the information from one side of the device when using the other. One embodiment is for the invention to use both sides at once to determine joint data. For example, the patient may see the image of a body part needing diagnosis on the screen, derived from the rear facing camera, but the front facing camera may also be on to help determine pain levels as disclosed previously. For example, the patient may be asked to point the rear camera at his injured ankle and move it a certain way—an overlay is then drawn to show where the ankle needs to be moved to—but the front facing camera detects blood flow and facial expression changes to automatically determine the patient's pain level. This pain level can then be checked with the patient to make sure it is accurate.

Figure 5:
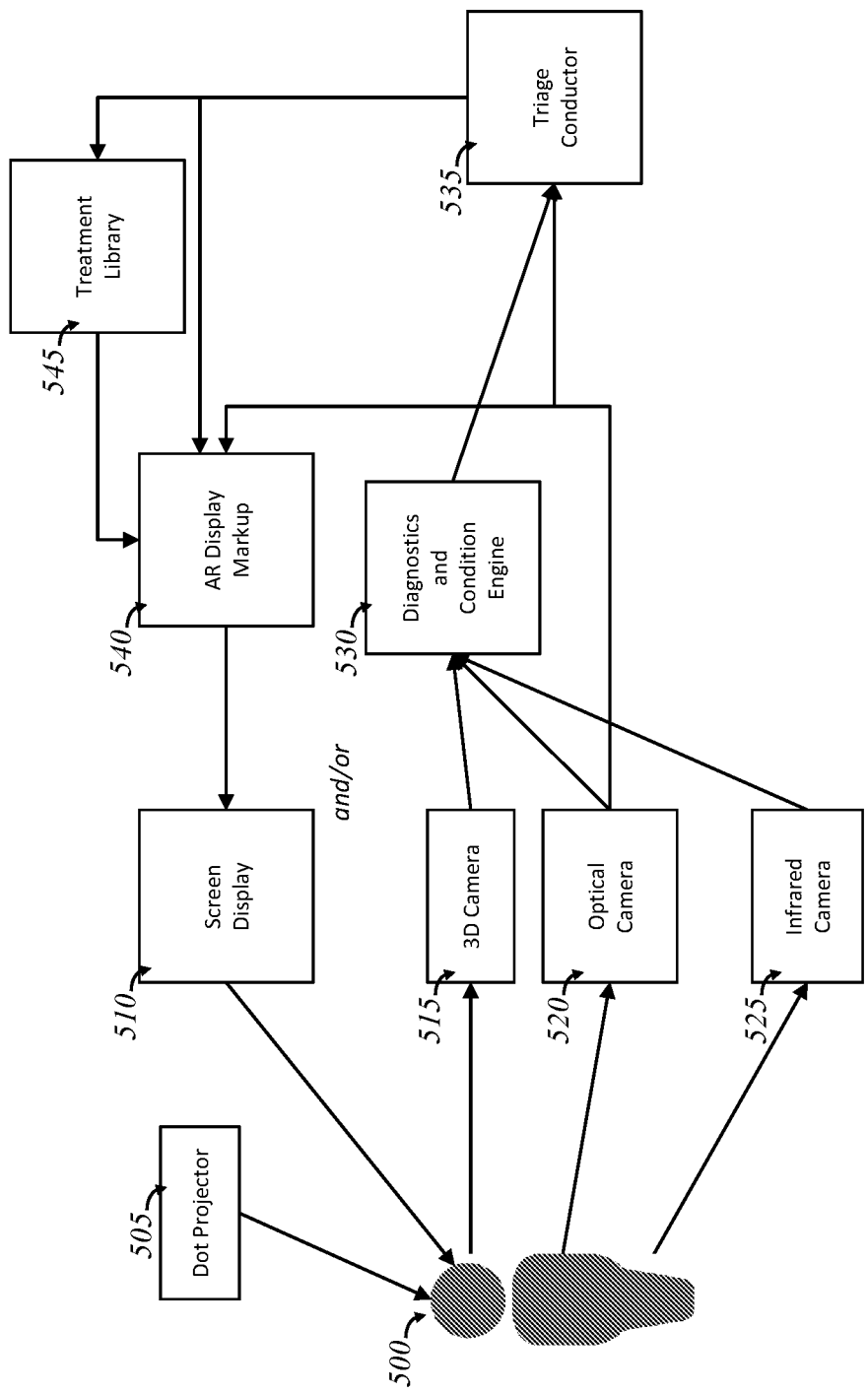
FIG. 5 is a diagram of an embodiment of the invention targeting triage further referencing a treatment library.

As a part of triage, in one embodiment the patient is then asked to perform certain behaviors on camera that fix the problem. FIG. 5 displays a structure for performing this. A broken finger may be temporarily stabilized by a specific taping method, that splints the finger in place without causing undue pain. The embodiment illustrated in FIG. 5 includes several of the components illustrated in and described with reference to FIG. 1 and FIG. 3. For example, in one embodiment, blocks 505, 515, 520, and 525 shown in FIG. 5 are the same as blocks 105, 115, 120, and 125 shown in FIG. 1, respectively, and blocks 540, 530 and 535 shown in FIG. 5 are the same as blocks 440, 430 and 435 shown in FIG. 4, respectively. The AR markup 540 references a treatment library 545 to show the methods of treatment, when called upon by the triage conductor 535. The treatment methods may cause additional pain or injury, which is where the value comes in with having this system remain on line during the treatment. Of course, augmented reality is not needed for this—though it is incredibly helpful—and another embodiment has the AR display markup replaced with a simple display engine that need not take the feed from the optical camera but instead shows generic visual information.

Finally, non-triage behaviors, such as training a patient to perform injections or other operations, may be used with this system as well. The use of AR overlays of the procedures is an explicit embodiment of this invention. In this case, the word "triage" is a misnomer, but the method remains the same, and the value of measuring the difficulty or pain caused by the behavior remains of value.

In the description herein, one or more embodiments of the invention are described, with process steps and functional interactions. Those skilled in the art would realize, after perusal of this application, that embodiments of the invention might be implemented using a variety of other techniques not specifically described, without undue experimentation or further invention, and that such other techniques would be within the scope and spirit of the invention. The use of the words "can" or "may" in regards to the structure and operation of embodiments is to be construed as referring to further embodiments and configuration options, and does not require further experimentation or invention.

The scope and spirit of the invention is not limited to specific examples disclosed therein, but is intended to include the most general concepts embodied by these and other terms.

Although the invention has been described with reference to several exemplary embodiments, it is understood that such descriptions and illustrations are not limiting. Changes May be made within the purview of the appended claims, as presently stated, without departing from the scope and spirit of the invention in its aspects. Although the invention has been described with reference to particular means, materials, machines, and embodiments, the invention is not intended to be limited to the particulars disclosed; rather, the invention extends to all functionally equivalent structures, methods, machines, and uses such as are within the scope of the invention and claims.

I claim:

1. A method performed on a hand-held mobile device having a three-dimensional, depth, camera and an infrared camera, the method comprising:
    outputting, on the hand-held mobile device, augmented reality overlays that guide a patient in positioning and operating the hand-held mobile device to capture images of the patient's body using the three-dimensional depth camera, wherein the images capture the patient's body with varying visual depths;
    capturing depth images from the three-dimensional depth camera and thermal images from the infrared camera of a chest region of the patient;
    extracting, on the hand-held mobile device, body movement of the patient's chest region from the captured depth and thermal images;
    analyzing, on the hand-held mobile device, the extracted body movement using a patient-specific motion model stored and iteratively updated on the hand-held mobile device to detect at least one medical condition of the patient's heart or lungs; and
    producing, on the hand-held mobile device, an indication of at least one of a potential medical condition and a potential lack of a medical condition.

2. The method of claim 1, wherein the three-dimensional depth camera comprises multiple optical cameras.

3. The method of claim 1, wherein the analyzing includes comparing the body movement to at least one of pathological and nonpathological models that are based off of machine learning training.

4. The method of claim 1, wherein the analyzing detects at least one of torn cartilage, ligament, or joint tissue conditions.

5. The method of claim 1 further comprising transmitting one or more of the images to a person at a remote location.

6. The method of claim 5 further comprising receiving an input from the person that influences information the patient is presented.

7. The method of claim 5, wherein at least one of an image or a video is altered to show relevant medical information in a reconstructed manner that at least partially modifies a view of at least one distinguishing feature of the patient.

8. The method of claim 1, further comprising using graphical feedback to the patient, wherein the feedback performs at least one of instructing the patient to perform a procedure, instructing the patient to participate in a challenge, instructing the patient to perform an operation, and delivering medical information to the patient.

9. The method of claim 8, wherein said graphical feedback incorporates at least one of overlaying graphics on top of still images, overlaying graphics on top of video, and using augmented reality.

10. A hand-held mobile device, comprising:
    a three-dimensional camera that generates images with varying visual depths;
    an infrared camera configured to capture thermal images;
    an output device configured to output augmented reality overlays that guide a patient, in real-time, to position and operate the hand-held mobile device for capturing images of a chest region of the patient's body using the three-dimensional camera, wherein the images capture the patient's body with varying visual depths and with the capture of thermal images by the infrared camera;
    a first machine learning algorithm performed on the hand-held device and configured as a feature/motion extractor that extracts patient movement from the chest region from a fusion of the varying visual depth images and the thermal images;
    a second machine learning algorithm performed on the hand-held device and configured as a feature/motion analyzer that analyzes the extracted patient movement using a patient-specific motion model stored and iteratively updated on the hand-held mobile device to detect medical conditions of the patient's heart or lungs; and
    a medical condition indicator that generates an indication of at least one of a potential medical condition and a potential lack of a medical condition, wherein the feature/motion extractor, the feature/motion analyzer, and the medical condition indicator are implemented by the hand-held mobile device.

11. The hand-held mobile device of claim 10, wherein the three-dimensional camera comprises multiple optical cameras.

12. The hand-held mobile device of claim 10, wherein the feature/motion analyzer compares the patient movement to at least one of pathological and nonpathological models that are based off of machine learning training.

13. The hand-held mobile device of claim 10, wherein the feature/motion analyzer detects indications that relate to at least one of torn cartilage, ligament, or joint tissue conditions.

14. The hand-held mobile device of claim 10 further comprising transmitting one or more of the images to a person at a remote location.

15. The hand-held mobile device of claim 14 further comprising receiving an input from the person that influences information the patient is presented.

16. The hand-held mobile device of claim 14, wherein at least one of the images is altered to show relevant medical information in a reconstructed manner that at least partially modifies a view of at least one distinguishing feature of the patient.

17. The hand-held mobile device of claim 10, further comprising a screen display that provides graphical feedback to the patient, wherein the feedback performs at least one of instructing the patient to perform a procedure, instructing the patient to participate in a challenge, instructing the patient to perform an operation, and delivering medical information to the patient.

18. The hand-held mobile device of claim 17, wherein said graphical feedback incorporates at least one of overlaying graphics on top of still images, overlaying graphics on top of video, and using augmented reality.

19. The method of claim 1, wherein the three-dimensional depth camera is coupled to a dot projector.

20. The hand-held mobile device of claim 10, wherein the three-dimensional camera is coupled to a dot projector.

21. The method of claim 1, wherein at least one of the indications detected relate to at least one of infections, inflammation, joint injury, movement disorders, blood flow, blood flow disorders, heart rate, breathing, breathing disorders, sexual function, sexual dysfunction, mood, emotional state, psychological conditions, displeasure, and pain.

* * * * *